US008442324B2

(12) United States Patent
Bates et al.

(10) Patent No.: US 8,442,324 B2
(45) Date of Patent: May 14, 2013

(54) METHOD AND SYSTEM FOR DISPLAYING IMAGE BASED ON TEXT IN IMAGE

(75) Inventors: Cary L. Bates, Rochester, MN (US); Bo Tu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 12/257,671

(22) Filed: Oct. 24, 2008

(65) Prior Publication Data
US 2009/0110287 A1   Apr. 30, 2009

(30) Foreign Application Priority Data

Oct. 26, 2007 (CN) .......................... 2007 1 0180297

(51) Int. Cl.
*G06K 9/46*   (2006.01)
(52) U.S. Cl.
USPC ............ 382/190; 382/181; 382/218; 382/224
(58) Field of Classification Search .................. 382/190, 382/298, 181, 224, 232, 218
See application file for complete search history.

(56) References Cited

U.S. PATENT DOCUMENTS

| | | | | |
|---|---|---|---|---|
| 5,943,443 A * | 8/1999 | Itonori et al. | ................. | 382/225 |
| 7,317,833 B2 * | 1/2008 | Kaneda | ......................... | 382/176 |
| 7,508,998 B2 * | 3/2009 | Shiiyama | ....................... | 382/305 |
| 7,813,595 B2 * | 10/2010 | Nagarajan et al. | ............. | 382/305 |
| 7,876,471 B2 * | 1/2011 | Tojo | ............................... | 358/1.18 |
| 8,077,976 B2 * | 12/2011 | Shiiyama | ....................... | 382/190 |
| 8,077,986 B2 * | 12/2011 | Tanaka | ........................... | 382/232 |
| 8,103,108 B2 * | 1/2012 | Morimoto et al. | ............. | 382/219 |
| 2002/0120653 A1 | 8/2002 | Kraft et al. | | |
| 2003/0210803 A1 * | 11/2003 | Kaneda et al. | ................. | 382/100 |
| 2006/0072830 A1 * | 4/2006 | Nagarajan et al. | ............. | 382/224 |
| 2006/0120627 A1 * | 6/2006 | Shiiyama | ....................... | 382/305 |
| 2007/0104366 A1 | 5/2007 | Sprague et al. | | |
| 2009/0080783 A1 * | 3/2009 | Hirohata | ........................ | 382/218 |

\* cited by examiner

*Primary Examiner* — Vu Le
*Assistant Examiner* — Aklilu Woldemariam
(74) *Attorney, Agent, or Firm* — Matthew J. Bussan (57) ABSTRACT

A method and a system for displaying an image based on texts in the image are provided. The method of the invention for displaying the image includes: a text extracting step, extracting text regions in the image to be displayed; a text occupancy amount calculating step, calculating occupancy amount of the text in said image; a comparing step, comparing the calculated occupancy amount with a predetermined threshold; a display step, displaying the image in real size of the image if said occupancy amount exceeds said predetermined threshold. It is achieved to display the image to the user in a manner of satisfying the viewing aim of the user, and unnecessary load of the computer system is avoided.

20 Claims, 7 Drawing Sheets

Creating a Program in One Step

You can use the CRTBNDC and CRTBNDCPP Create Bound Program commands to create a program (PGM object) in one step.

The Create Bound Program commands combine the steps of compiling and binding. Using them is the same as first calling the CRTCMOD or CRTCPPMOD Create Module command, then calling the Create Program (CRTPGM) command, except that the module created by the Create Module command step is deleted after the CRTPGM step.

To use the Create Bound Program commands, the source member must contain a main() function.

22 ILE C/C++ Programmer's Guide

METHOD AND SYSTEM FOR DISPLAYING IMAGE BASED ON TEXT IN IMAGE

BACKGROUND OF THE INVENTION

1. Field of the Invention

The invention relates to a method and a system for displaying an image based on a text in the image, and more particularly to a method and a system capable of displaying the image based on the text in the image by automatically determining whether to display the image in its real size or display the image in a reduced size to fit the screen.

2. Description of the Related Art

With development of information transmission technologies, such as computer technology and network technology and so on, image has been more and more popular as an intuitionistic expression of information in the fields of computer and network. The information represented by images are extremely rich, including people faces, landscape pictures, schematic diagrams, maps and so on, and even texts can be represented in the form of images. In addition, the types of information included in the same image are not single, for example, an image mostly of scene further includes texts, the background of people faces is a scene, and the like. A typical instance is a map which is a combination of schematic labels and texts. For various images, computers and network users give different emphases for requirement to them, for example, as for people faces and scene pictures, users normally intend to firstly feel them as a whole, while as for the image with texts as main expression for information, users normally intend to feel the details therein in which the image makes sense only if the main texts therein are recognizable. However, existing computers and networks do not select specific image display methods with respect to the requirements of different types of images, thereby resulting in that the display methods of images can not properly meet the demands of the users.

In earlier image display methods, such as ACDSee (registered trademark) image viewer management software of ACDSystems company, the image is displayed in its real size. In its earlier versions, such as version 2.4, in the case that the image is larger than the display screen, the user will normally see a part of the image at first, and if the user needs to first hold the image as a whole, the user needs to switch the display mode to display the image in a size fitting the screen. On one hand, the operations of the user are needed, and on the other hand, the user's waiting time is increased.

So far, in the case that the image to be displayed is larger than the display screen, the Internet Explorer (registered trademark) browser of Microsoft company use the mode of reducing the size of the image into the size fitting the display screen and then displaying it on the display screen, thereby the user can hold the image as a whole at first. In the case that the image mainly represents people faces or scenes, this kind of display mode can meet demands of the user well. However, in the case that the image contains a great number of texts and mainly represents the text information therein, or the image itself is an image of a text document, such reduction displaying is normally worthless for the user, because the user can not recognize the texts in the image. In such a case, the user has to move the cursor across the image to find and click an icon for enlarging the image, and waits for enlarging the image to its real size. On one hand, the operations of the user are needed, and on the other hand, the user's waiting time is increased.

In all, in the existing image display technologies, it is fairly impossible for either the mode for displaying the image in its real size or the mode for displaying the image in a reduced size to fit the screen to meet the demands of the user. Thus, on one hand, the operations of the user are needed, and on the other hand, the user's waiting time is increased. Therefore, there is needed a solution for displaying the image by automatically determining whether to display an image in its real size or in a reduced size to fit the screen, and existing Optical Character Recognition technology provides a possibility for realizing the object.

Optical Character Recognition (OCR) technology is a computer input technology for converting characters of various notes, newspapers and periodicals, books, documents and other publications into image information by an optical input method such as scanning, and then converting the image information into available format by a character recognition technology. It is applicable to the fields of bank notes, an amount of character material, archive files, the inputting and process of the document. Characters, letters and numbers in print can be automatically recognized, and characters, script letters, number and various symbols in script can be recognized by the OCR technology. OCR technology further has an automatic plate analyzing function capable of automatically analyzing a scanned plate, partitioning out the text regions to be recognized, and then performing recognition.

Optical Character Recognition includes the following key blocks: image inputting, image-preprocessing, character features extraction, comparative database, and comparative recognition.

Image inputting: an object to be processed by OCR transmits through optical devices, such as image scanners, facsimile machines or any photography equipments, and the images are sent to a computer. With the development of science and technology, the input devices such as scanners have been more and more refined, thinner, smaller, and of higher quality, and resolution of the scanners makes the images clearer and efficiency of the OCR processing is increased.

Image-preprocessing: it includes a process from a step of obtaining the images of black and white dualization, grayscale or color images to a step of separating respective texts and images. It relates to image processes such as image normalization, noise elimination, image correction, and so on, and file preprocesses such as analyzing images and texts, separating rows and characters of texts (that is, separating the rows of the texts in unit of row at first, and then separating the characters in the rows with respect to respective rows of the texts) and so on. For the image processing, the theories and the actual technologies have been mature, so there are various available link libraries in the market or network resources. For the file preprocesses, with respect to the image, firstly, regions of graphics, tables and texts are separated, even the arranging direction of the article, the outline of the article and the content body can be separated, and the sizes and fonts of the characters can also be determined as the original file.

Characters features extraction: in terms of resolution, operations for the features extraction, such as which feature to use, how to extract, and so on, influences the effect of recognition directly. The features can be divided roughly into two types: one type is statistical feature, such as black-white dots ratio of the text regions; the other type is structural feature, such as number and positions of stroke ends and cross points, or stroke sections of the characters obtained after the image of the characters is thinned.

Comparative database: standards and character information treated as correct are stored therein. After extracting features of the characters, the comparative database is necessary for comparing either the statistical features or structural features. Contents of the comparative database include a set of all the characters to be recognized, and groups of features which are obtained according to the same feature extraction method as that used for inputting the characters.

Comparative recognition: according to different features, different mathematical distance functions are selected. Comparison methods, such as the comparison method in Euclidean Space, Relaxation comparison method, Dynamic Programming (DP) comparison method, and establishment and comparison of neural network database, Hidden Markov Model (HMM), and so on, are normally used. To make the result of recognition more stable, the so-called Experts System is also proposed, which uses the difference and complementarity of various feature comparison methods to improve reliability of the recognition result.

In addition, there are many methods for calculating a total area of the image and an area of one character in the related art. Many methods can be used to calculate the total area of the image. For a regular image, the length and width of the image can be returned by an image library function so as to obtain the total area of the image, and for an image having complex edges and profile, an area partition method can be used which partitions the image into many small blocks, calculates the area of each block, respectively, and then calculates the sum thereof. With respect to one character, many methods can be used to obtain either its size or its margins including up and down margins and left and right margins. The size of the margin can be represented by a pixel value. It is assumed that some character has a size of 5 pt, its size is 80×80 pixels, and all of the up, down, left and right margins are 5 pixels, so the area occupied by this character is 85×85 pixels.

The US patent application publication No. US2007/0104366A1 discloses a solution for extracting and reordering text regions in an image, so as to show texts stored in the format of image to the user. In the solution, if the image contains one or more text regions, and the respective text regions in the image have explicit edges, the OCR technology can be used to extract the respective text regions from the image to form sub-images, respectively. Then, the respective sub-images are reordered according to a preset order, such as reading order of the text, and are displayed to the user for the reading. However, the solution does not involve how to judge whether to display the image in its real size or in its reduced size to fit the screen.

The US patent application publication No. US2002/0120653A1 discloses a solution for obtaining text information in an image for a user to browse a webpage. In the case that the image browsed by the user contains text regions, the text regions in the image are recognized by a filter, characters in the text regions are recognized and extracted by the OCR technology, and then the characters are enlarged for displaying. The solution assumes that the characters in the image are relatively small and inconvenient for the user to read, so the characters in the image are extracted and enlarged. Accordingly, the solution does not involve judgment of whether to adjust the image to fit the display screen. The practical cases are normally that, the characters in the image are suitable for the user to read in its real size, but the user can not read the characters in the image as the browser automatically reduces the size of the image. Thus it is not necessary to enlarge the characters in the images in any case. Therefore, the solution results in worthless waste of computer system resources to a great extent. Particularly, with respect to an image having close relation between text regions and graphic regions, e.g. a map, if the texts representing place-names and legends in the map image are extracted to be displayed individually, they make no sense for the user.

Therefore, none of the existing solutions using OCR technology to process a text image can provide a technology capable of automatically determining whether to display the image in its reduced size to fit the display screen, resulting in the user's inconvenience in browsing and unnecessary load of the computer system.

SUMMARY OF THE INVENTION

The invention is proposed with respect to the above defects existing in the related art, and the technical problem to be solved is to provide a method and a system for displaying an image based on a text in the image, in order to display the image to the user in a manner of meeting the user's needs, so as to facilitate the user's viewing and avoid the unnecessary load of the computer system.

According to an aspect of the invention, a method for displaying an image based on a text in the image is provided, the method including: a text extracting step, extracting text regions in the image to be displayed; a text occupancy amount calculating step, calculating occupancy amount of the text in said image; a comparing step, comparing the calculated occupancy amount with a predetermined threshold; a display step, displaying the image in real size of the image if said occupancy amount exceeds said predetermined threshold.

According to another aspect of the invention, a system for displaying an image based on a text in the image is provided, the system including: a text extractor, extracting text regions in the image to be displayed; a text occupancy amount calculator, calculating occupancy amount of the text in said image; a comparator, comparing the calculated occupancy amount with a predetermined threshold; a display, displaying the image in real size of the image if said occupancy amount exceeds said predetermined threshold.

According to the invention, with the current electric maps being more and more popular in the computers and network resources, and more and more organizations and persons saving files with files captured by digital cameras, it is judged whether to display the image in its real size or in its reduced size to fit the screen by automatically calculating occupancy amount of the text in the image, so that time and the user's operations can be saved, errors caused by the user trying to read too small images are removed, and whole availability of the browsers can be increased.

BRIEF DESCRIPTION OF THE DRAWINGS

The selected embodiments of the invention and objects, features and advantages thereof can be understood from the detailed description below in conjunction with the accompanying drawings in which.

DESCRIPTION OF PREFERRED EMBODIMENTS

The embodiments of the invention are explained below in details with reference to the accompanying drawings.

Figure 1:
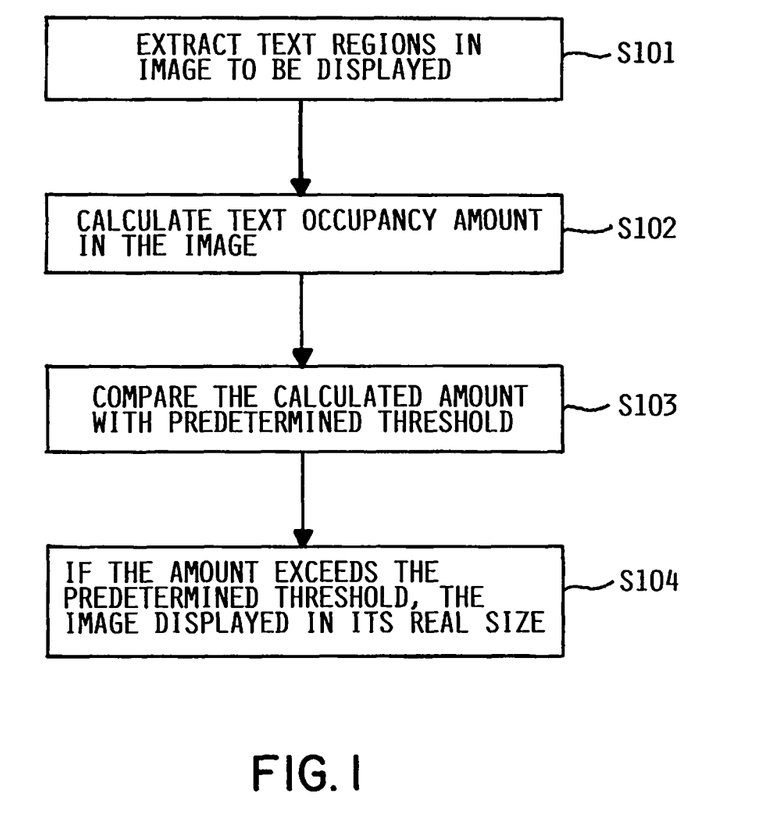
FIG. 1 is a general flowchart showing an image display method to which the invention is applied.

FIG. 1 is a general flowchart showing an image display method applying the invention. First, in step S101, with respect to an image to be displayed, text regions therein are extracted. This step can be realized by Optical Character Recognition (OCR) technology, but it is obvious that any technologies capable of judging and distinguishing the text regions from the image can be used in processing of the step. Then, in step S102, a text occupancy amount in the image is calculated, and the calculated occupancy amount is compared with a predetermined threshold in step S103. At last, in step S104, if the calculated occupancy amount is larger then the predetermined threshold, the image is considered as an image with high text occupancy amount, and is displayed in its real size.

Figure 5:
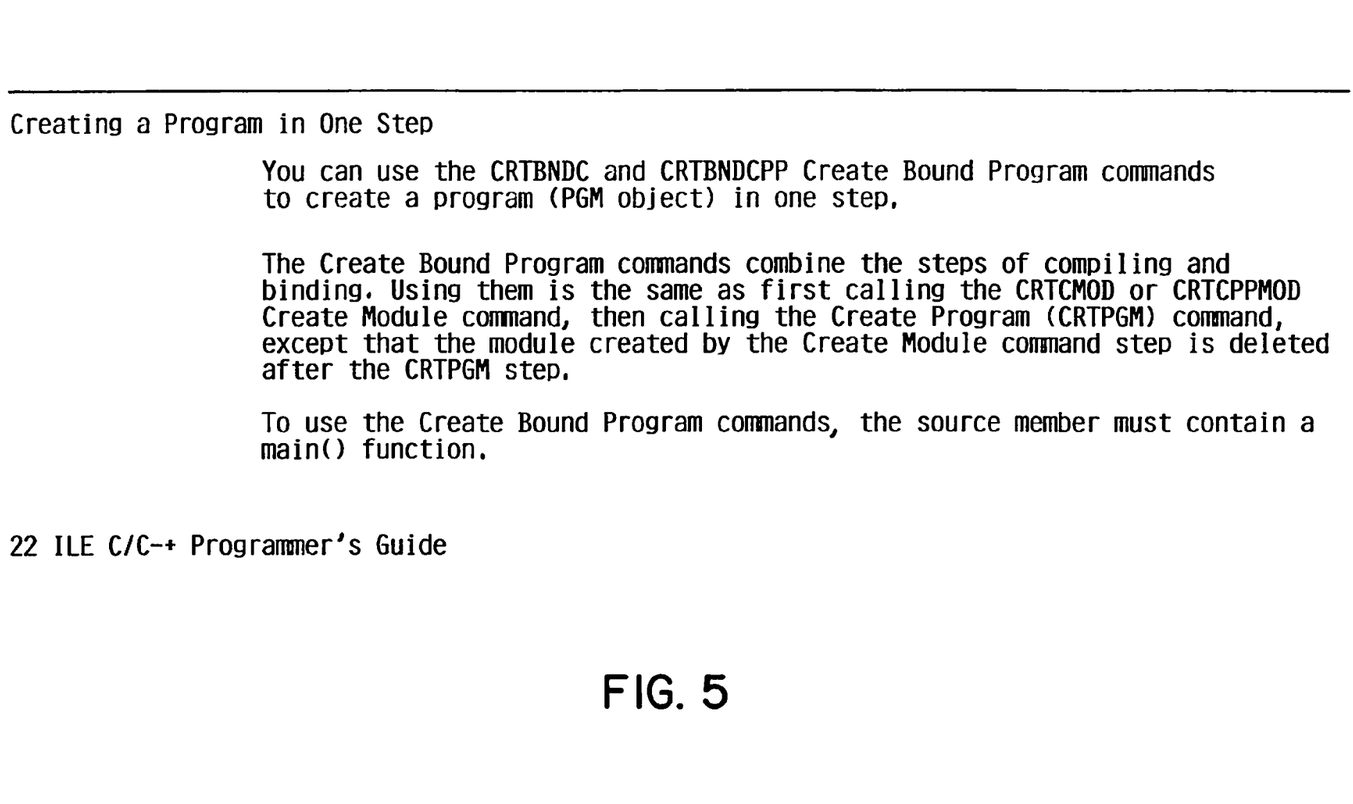
FIG. 5 shows an example of an image with high text occupancy amount.
Figure 6:
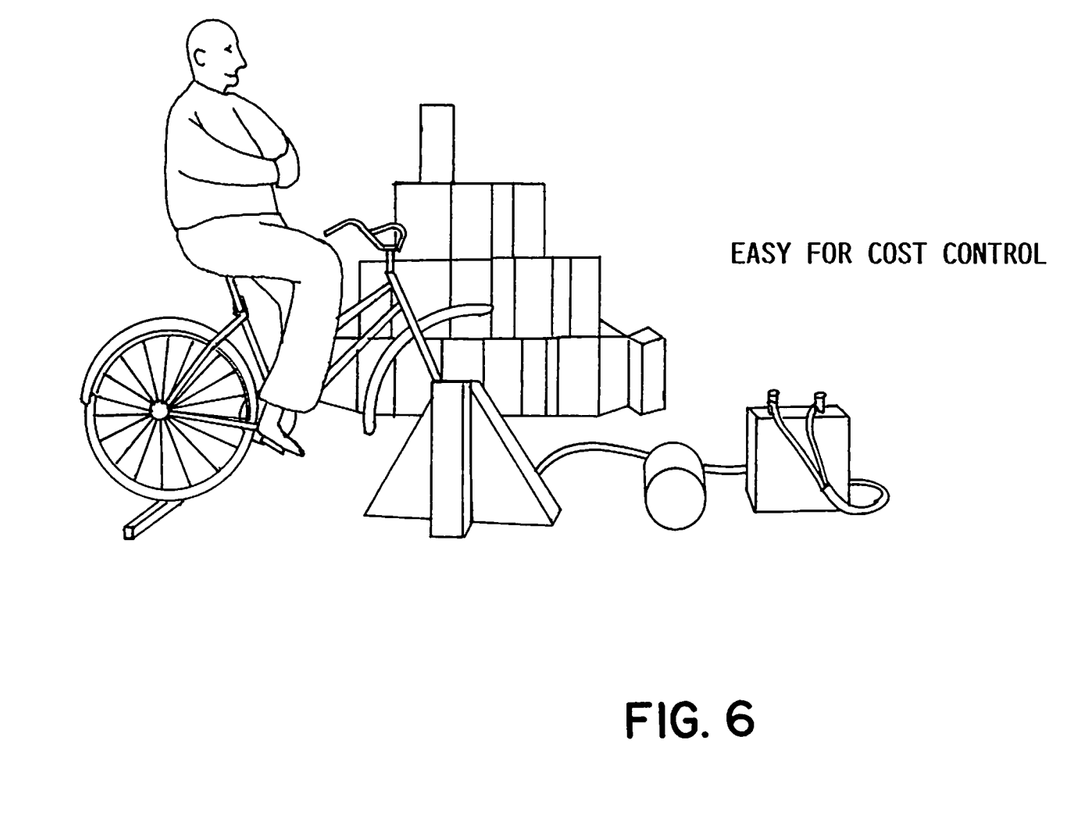
FIG. 6 shows an example of an image with low text occupancy amount.
Figure 7:
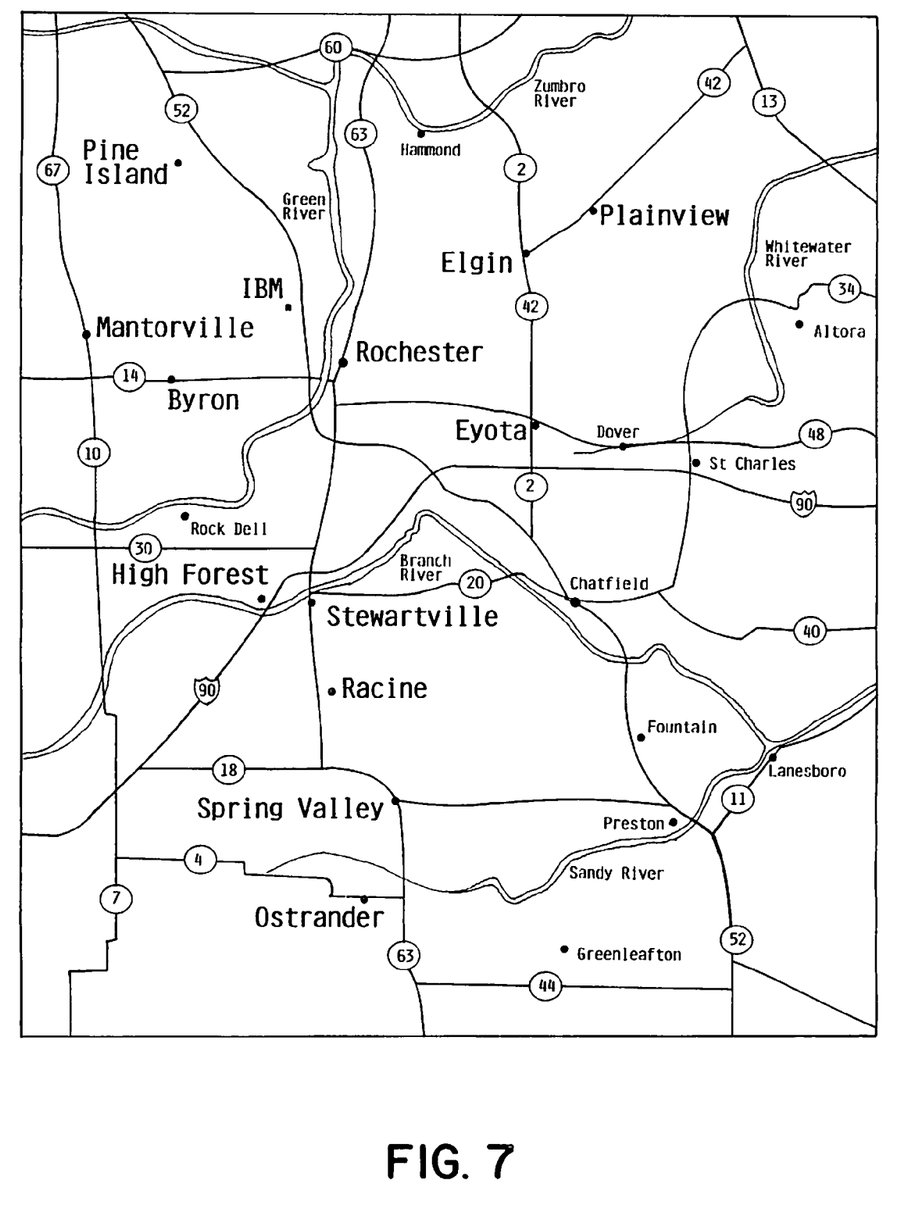
FIG. 7 shows an example of a map image with high text occupancy amount.

The image shown in FIG. 5 is judged as having a high text occupancy amount by the method shown in FIG. 1, and thus is displayed in it real size. The image shown in FIG. 6 is judged as having a low text occupancy amount, and thus is displayed in its reduced size to fit the display screen. The map image shown in FIG. 7 is judged as having a high text occupancy amount, and thus the map image is displayed in it real size.

The method of calculating the text occupancy amount and setting the threshold is explained in details below.

Some considerable factors can be imagined as indexes as required, such as spell, grammar, and so on, of the texts. If errors of the spell and the grammar are too many, the readability of the texts is low and the text occupancy amount in the image should be reduced. The number of the text regions in the image can also be considered as an index, for example, the texts in a map is disperse, so although the total number of the texts in the map is not very high, the text occupancy amount in the image should be increased if the number of the text regions in the image is relatively great. An average font size of characters in the extracted text regions can also be considered as an index, where if the average font size of the characters in the extracted text regions is relatively big, the requirement for displaying the image in its real size will decrease, and the text occupancy amount in the image should be reduced. In addition, percentage of area of a text region with respect to the image's area can also be considered as an index, wherein the text occupancy amount in the image should be reduced when the percentage is high.

Those skilled in this art should understand that the above indexes are not to enumerate exclusively all the factors that should be considered when calculating the text occupancy amount in the image, and rather, obviously the above indexes are independent of each other, so they can be adopted freely in design or use by the user.

As a method of evaluating the scores of respective selected indexes, a normalization method can be used for comparison with the threshold. In addition, let all the scores be positive, and the text occupancy amount in the image may be obtained by dividing a sum of the scores of the selected indexes by a sum of the full marks of the selected indexes, as shown in formula (1):

$$\frac{N1 + N2 + \Lambda + Nk}{M1 + M2 + \Lambda + Mk} = Q \quad (1)$$

wherein, k indexes are selected, N1 is a score of the $1^{st}$ index, M1 is a full mark of the $1^{st}$ index, N2 is a score of the $2^{nd}$ index, M2 is a full mark of the $1^{st}$ index, Nk is a score of the $k^{th}$ index, Mk is a full mark of the $k^{th}$ index, and Q is the text occupancy amount in the image. Obviously, Q is a normalized value in [0, 1].

Obviously, the method with normalized value may be not used, and the scores of respective indexes are summed up as the text occupancy amount Q. It may be also considered that a part of or all of the indexes are negative value, and the text occupancy amount in the image can also be negative. Those skilled in this art should understand that the evaluation system can be designed in various forms, as long as functions of the selected indexes are properly exhibited.

Respective evaluation methods for each index can be realized by performing statistical calculation on a large number of text images. For example, as for the index of spell, it can be assumed that the full mark is 100, from which 1 is subtracted when one spell error occurs until 0. As for the index of grammar, it can be assumed that the full mark is 100, from which 2 is subtracted when one grammar error occurs until 0. As for the index of the number of the text regions, it can be assumed that the full mark is 100, and 1 is added when one text region appears up to 100. As for the index of the average font size of the characters, it can be assumed that the full mark is 100, and the average font size is from No. 72 (and the above) to No. 5 (and the below) or from No. 1 (and the below) to No. 8 (and the above) with the score gradually from 0 to 100. As for the index of the percentage of the area of the texts region with respect to the image's area, it may be assumed that the full mark is 100, and the value of the percentage is the score.

Obviously, the above evaluation method can be adjusted according to design requirements or the user's selection, for example, the full mark may be arbitrary score, even a negative. The evaluation system for respective indexes can be adjusted, for example, 2 is subtracted when one spell error occurs, 5 is subtracted when one grammar error occurs, or 2.5 is added when there is one text region. With respect to the evaluation for the average font size, the scores of the cases where the font is above No. 28 can be all set to 0, and the relation between the font number and the score can be linear or any other relations of monotone function. As for the evaluation for the percentage of area of the texts region with respect to the image's area, the relation between the percentage and the score can be any other relations of monotone function.

In addition, to exhibit different importance among the respective indexes, the full marks of the respective indexes can be set to be different, for example, in the case that the normal full mark of the index is 100, if the index of the average font size is considered as more important, its full mark can be set to 150, while if the index of the number of the text regions is considered as less important, its full mark can be set to 50. Alternatively, the different importance between the respective indexes can be represented by weights set for the respective indexes. It is assumed that the weights of the indexes 1 to k are W1 to W5, respectively, and the method for calculating the text occupancy amount in the image may be as shown in formula (2).

$$\frac{W1 \times N1 + W2 \times N2 + \Lambda + Wk \times Nk}{W1 \times M1 + W2 \times M2 + \Lambda + Wk \times Mk} = Q \quad (2)$$

The spell and/or grammar of the texts in the extracted text regions can be checked by existing spell checker and/or grammar checker. For example, the word processing software "Word" and the e-mail receiving/transmitting software "Outlook" of Microsoft employs technologies for checking the spell and/or grammar of the texts. The number of the spell and/or grammar errors in the texts may be counted by a counter. For the texts with the spell and/or grammar errors checked, the score of the corresponding index may be reduced. In the case that other indexes are also selected, a processing method for excluding the texts with errors can also be selected, that is, in evaluation of the other indexes, the text regions with spell and/or grammar errors will be no longer considered.

While recognizing and extracting the text regions (step S101), the number of the extracted text regions can be counted by a counter simultaneously to obtain the number of the text regions in the image. However, obviously, the operation of obtaining the number of the text regions in the image can also be performed after the operation of extracting the text regions in the image and in step S102 of calculating the text occupancy amount in the image.

The operation of calculating the average font size of the characters in the extracted text regions can be performed in the following two ways.

One way is that the font size of each character is returned by OCR technology one by one, and a sum of the font sizes of characters is divided by a total number of the characters in the image. If there are totally r characters in the image, which are C1, C2 ... Cr, respectively, and the font sizes corresponding to the characters are F1, F2 ... Fr, respectively, the average font size AFS of the image may be calculated according to the formula (3):

$$AFS = \frac{F1 + F2 + \Lambda + Fr}{r} \quad (3)$$

The other way is that an average font size of each text region is returned by OCR technology one by one. If there are totally s text regions in the image, which are T1, T2, .... Ts, respectively, the numbers of characters contained in the text regions are G1, G2, ... Gs, respectively, and the average font sizes of the text regions are AFS1, AFS2, ... AFSs, respectively, the average fort size of the image may be calculated according to the formula (4):

$$AFS = \frac{G1 \times AFS1 + G2 \times AFS2 + \Lambda + Gs \times AFSs}{G1 + G2 + \Lambda Gs} \quad (4)$$

The operations of calculating the area of the extracted text regions and calculating the percentage of the text regions' area with respect to the area of said image can be performed in the following two ways.

One way is that the area of each text region is obtained by OCR technology, and if there are totally s text regions, which are T1, T2, ... Ts, respectively, and whose areas are D1, D2, ... Ds, respectively, and the total area of the image is H, the percentage of the text regions' area in the image can be calculated according to formula (5):

$$P = \frac{D1 + D2 + \Lambda + Ds}{H} \quad (5)$$

The other way is that font size of each character is returned by OCR technology one by one, the font sizes are converted into an area occupied by the character, and if there are totally r characters in the image, which are C1, C2 ... Cr, respectively, and occupy areas of E1, E2, ... Er, respectively, and the total area of the image is P, the percentage of the areas of text regions in the image can be calculated according to formula (6):

$$P = \frac{E1 + E2 + \Lambda + Er}{H} \quad (6)$$

When performing calculation by above formula (1) or (2) on a substantial number of existing text images, if the obtained text occupancy amount Q in the image ranges in [Q1, Q2], the Q1 may be selected as a threshold TH that is a standard for judging whether to display the image in its real size, or in its reduced size to fit the screen. According to result of comparison between the calculated text occupancy amount Q in the image and the threshold TH, if the occupancy amount Q exceeds the threshold TH, the image is considered as having a high text occupancy amount so that it is displayed in real size, and if the occupancy amount Q is less than the threshold TH, the image is considered as having a low text occupancy amount so that it is displayed in the reduced size to fit the screen. Obviously, determination of the threshold may also be performed according to design requirements or the user's selection, for example, the threshold may be set to Q2, or any number between Q1 and Q2, even a number less than Q1 or a number more than Q2, as long as the set threshold TH meets the requirements of a particular user for displaying an image.

The threshold TH may be single, or be multiple thresholds of different extent to be selected by the user, or be set by the user freely.

Figure 2:
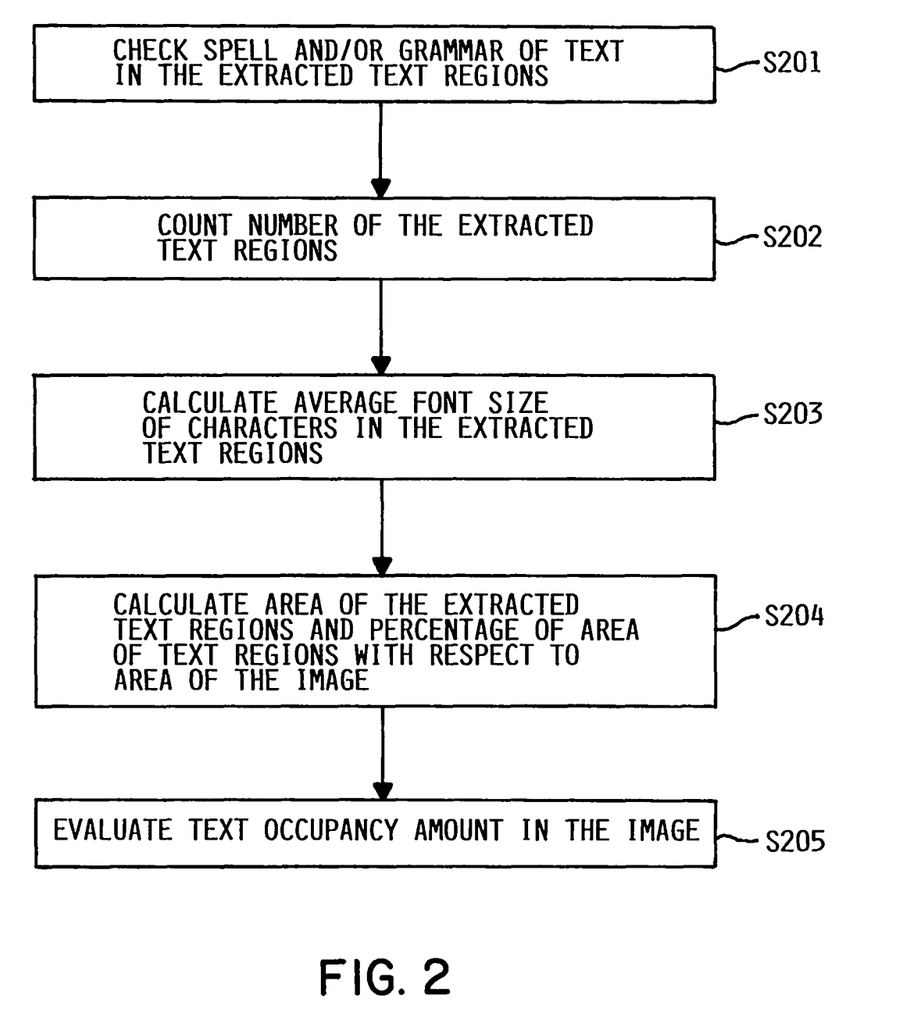
FIG. 2 is a flowchart showing a method for calculating occupancy amount of a text in an image.

FIG. 2 shows a flowchart of a method of calculating a text occupancy amount in an image in the case that an index of spell and/or grammar, an index of number of text regions, an index of average font size, and an index of percentage of the text region's area are selected.

In step S201, the spell and/or grammar of texts in the extracted text regions are checked. If spell and/or grammar errors are checked out, the score of the index is reduced. Alternatively, the text regions with errors may be excluded, and will no longer be considered in subsequent steps.

In step S202, the number of the extracted text regions is counted. In step S203, an average font size of the characters in the extracted text regions is calculated. The method by the above formula (3) or (4) may be used.

In step S204, areas of the extracted text regions and the percentage of the text regions' areas with respect to the area of the image are calculated. The method described by the above formula (5) or (6) may be used.

In step S205, according to the checked condition of spell and/or grammar, the number of the text regions, the average font size, and the percentage of the text regions' area with respect to the image's area, the text occupancy amount in the image can be evaluated. The method described by the above formula (1) or (2) may be used. It is assumed that the spell has a score of N1, a full mark of M1, and a weight of W1; the grammar has a score of N2, a full mark of M2, and a weight of W2; the number of the text regions has a score of N3, a full mark of M3, and a weight of W3; the average font size has a score of N4, a full mark of M4, and a weight of W4; the percentage of the area of the text regions has a score of N5, a full mark of M5, and a weight of W5, then the text occupancy amount Q in the image can be calculated according to the following formula (7):

$$Q = \frac{W1 \times N1 + W2 \times N2 + W3 \times N3 + W4 \times N4 + W5 \times N5}{W1 \times M1 + W2 \times M2 + W3 \times M3 + W4 \times M4 + W5 \times M5} \quad (7)$$

Obviously, in the case of only checking the spell but not the grammar, the items of W2×N2 and W2×M2 in the above formula (7) should be removed. Similarly, n the case of only checking the grammar but not the spell, the items of W1×N1 and W1×M1 should be removed.

Those skilled in the art may understand that each step in the method of calculating the text occupancy amount in the image as shown in FIG. 2 is not limited by the specific order and combination manner disclosed in FIG. 2, wherein the steps S201-S204 are independent of each other and can be individually selected for use according to design requirements and user's decision, and also the order of the selected steps can be adjusted freely.

For example, only the step S201 can be selected that is checking the spell and/or grammar of the text in the extracted text region, and evaluating the text occupancy amount in the image based on the checked condition of the spell and/or grammar. In such case, the text occupancy amount Q in the image can be calculated according to the following formula (8):

$$Q = \frac{W1 \times N1 + W2 \times N2}{W1 \times M1 + W2 \times M2} \quad (8)$$

For example, only the step S202 can be selected that is counting the number of the extracted text regions and then evaluating the text occupancy amount in the image based on the number of the text regions in the image. In such case, the text occupancy amount Q in the image can be calculated according to the following formula (9):

$$Q = \frac{W3 \times N3}{W3 \times M3} \quad (9)$$

For example, only the steps S202, S203 and S204 can be selected which are counting the number of the extracted text regions, then calculating the average font size of the characters in the extracted text region, calculating the area of the extracted text region and the percentage of the area of the extracted text region with respect to the image's area, and evaluating the text occupancy amount in the image based on the number of the text regions, the average font size, and the percentage of the text regions' area. In such case, the text occupancy amount Q in the image can be calculated according to the following formula (10):

$$Q = \frac{W3 \times N3 + W4 \times N4 + W5 \times N5}{W3 \times M3 + W4 \times M4 + W5 \times M5} \quad (10)$$

Alternatively, for example, only the steps S201 and S202 are selected, which are checking the spell and/or grammar of the text in the extracted text region, counting the number of the extracted text regions, and then evaluating the text occupancy amount in the image based on the checked condition of the spell and/or grammar and the number of the text regions. In such case, the text occupancy amount Q in the image may be calculated according to the following formula (11):

$$Q = \frac{W1 \times N1 + W2 \times N2 + W3 \times N3}{W1 \times M1 + W2 \times M2 + W3 \times M3} \quad (11)$$

where the operation of obtaining the score of each index from the condition of the index can be performed either in the steps of obtaining the condition of each index, such as the steps S201-204, or in the steps of evaluating the text occupancy amount in the image, such as the step S205.

Actually, the combination manners of the indexes selected for calculating the text occupancy amount in the image are not limited to the above examples. In addition, during executing the method of the invention for displaying image based on the text in the image, it may be detected whether the user sends an instruction to display the image in its resized size to fit the display screen, and if it is detected that the user sends the instruction to display the image in its resized size to fit the display screen, the image is reduced to fit the display screen and redisplayed.

Below, the system of the invention for displaying image based on the text in the image will be described.

Figure 3:
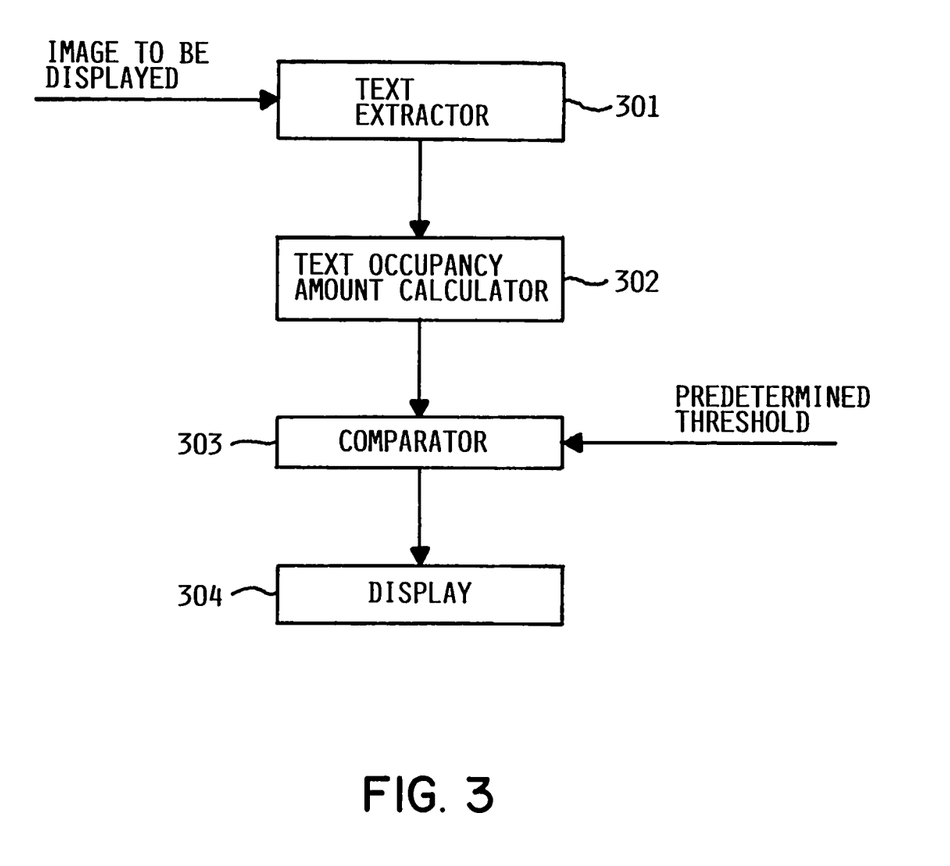
FIG. 3 is a general block diagram showing an image display system to which the invention is applied.

FIG. 3 is a general block diagram showing an image display system applying the invention. A text extractor 301 extracts text regions from an image to be displayed. The above operation of the text extractor 301 can be realized by Optical Character Recognition (OCR) technology, and obviously, any technology capable of judging and distinguishing the text regions from the image can be applied to the processing of the text extractor 301. Then, a text occupancy amount calculator 302 calculates a text occupancy amount Q in the image according to the above formula (1) or (2). Then, a comparator 303 compares the calculated amount with a predetermined threshold. At last, if the calculated amount exceeds the predetermined threshold, a display 304 displays the image in its real size as an image with a high text occupancy amount.

The text occupancy amount calculator 302 of the invention may use the above indexes as those for evaluating the text occupancy amount in the image, and use the above evaluation system as that for evaluating the respective indexes. In the present invention, devices are designed, respectively, to process the indexes and obtain conditions of each index.

Figure 4:
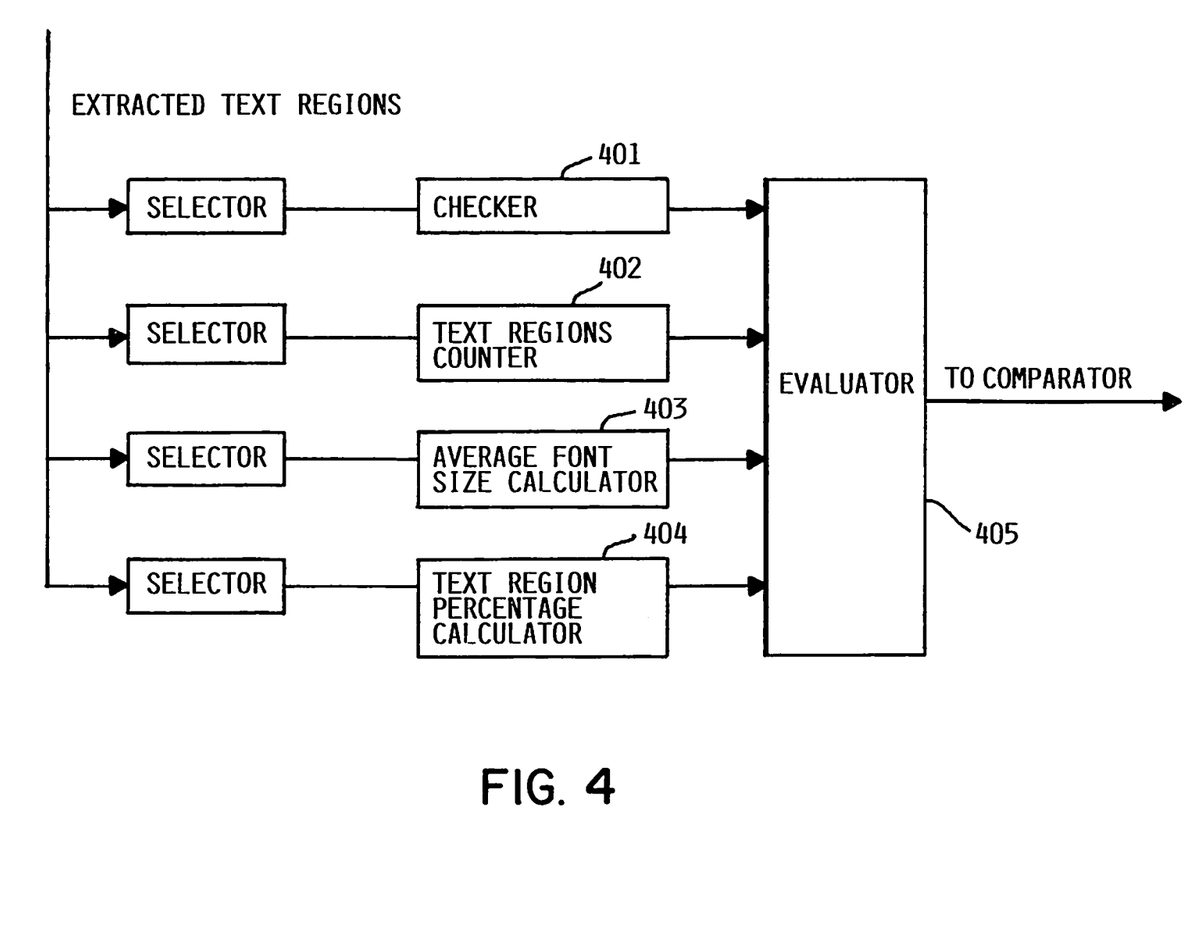
FIG. 4 is a block diagram showing an apparatus for calculating the occupancy amount of the text.

FIG. 4 shows a component block diagram of the text occupancy amount calculator 302 for calculating the text occupancy amount in the image in the case that an index of spell and/or grammar, an index of number of text regions, an index of a average font size, and an index of percentage of the text regions' area are used.

A checker 401 checks the spell and/or grammar of the texts in the extracted text regions. If some spell and/or grammar errors are checked out, the score of this index is reduced. A text region counter 402 counts the number of the extracted text regions.

An average font size calculator 403 may calculate the average font size of the characters in the extracted text regions by performing the operations in the above formula (3) or (4).

A text region percentage calculator 404 may calculate the extracted text regions' area and the percentage of the text regions' area with respect to the image's area by performing the operations in the above formula (5) or (6).

The processing results of the above devices 401-404 are output to an evaluator 405, respectively, which calculates the text occupancy amount in the image according to the above formula (7).

Those skilled in the art should understand that in the text occupancy amount calculation means as shown in FIG. 4, obviously the component devices are not limited to the specific combination manners disclosed in FIG. 4, but the devices 401-404 may be independent of each other, and can be individually selected for use according to the design requirements and the user's decision. One selector can be set for each of the devices 401-404, thereby enabling the user to control whether to select the corresponding devices or not by the selectors in design or use.

The processing for obtaining scores of the indexes from the conditions of respective indexes can be performed either in the device for acquiring the conditions of respective indexes, such as the devices 401-404, or in the device for evaluating the text occupancy amount in the image, such as the evaluator 405.

In the case that the checker 401 only checks the spell but not the grammar, the items of W2×N2 and W2×M2 in the above formula (7) should be removed. Similarly, in the case that the checker 401 only checks the grammar but not the spell, the items of W1×N1 and W1×M1 in the above formula (7) should be removed.

Further, the text occupancy amount calculator 302 may be so configured that the checker 401 may exclude the text regions with spell and/or grammar errors after checking out these errors and output the texts excluding the text regions with errors to the devices 402-404, thereby the devices 402-404 will no longer consider the text regions with spell and/or grammar errors.

For example, in the devices 401-404, only the checker 401 may be selected and used, that is, the checker 401 checks the spell and/or grammar of the texts in the extracted text regions, and the evaluator 405 evaluates the text occupancy amount in the image according to the above formula (8) based on the checked conditions of the spell and/or grammar.

For example, in the devices 401-404, only the text region counter 402 may be selected and used, that is, the text region counter 402 counts the number of the extracted text regions, and the evaluator 405 evaluates the text occupancy amount in the image according to the above formula (9) based on the number of the text regions in the image.

For example, in the devices 401-404, only the text region counter 402, the average font size calculator 403 and the text region percentage calculator 404 may be selected and used, that is, the text region counter 402 counts the number of the extracted text regions, the average font size calculator 403 calculates the average font size of the characters in the extracted text regions, the text region percentage calculator 404 calculates the extracted text regions' area and the percentage of text regions' area with respect to the image's area, and then the evaluator 405 evaluates the text occupancy amount in the image according to the above formula (10) based on the number of the text regions, the average font size, and the percentage of the text regions' area with respect to the image's area.

For example, in the devices 401-404, only the checker 401 and the text region counter 402 may be selected and used, that is, the checker 401 checks the spell and/or grammar of the texts in the extracted text regions, the text region counter 402 counts the number of the extracted text regions, and then the evaluator 405 evaluates the text occupancy amount in the image according to the above formula (11) based on the checked conditions of the spell and/or grammar and the number of the text regions.

Actually, the combination manners of indexes to be selected to calculate the text occupancy amount in the image are not limited to the above examples. Further, in the system of the invention for displaying the image based on the texts in the image, a detector may be additionally set to detect whether the user sends an instruction for displaying the image in a reduced size to fit the display screen. If the instruction for displaying the image in the reduced size to fit the display screen is detected, then the image is reduced to fit the display screen size and redisplayed by the display.

According to the invention, it is automatically judged whether to display an image in its real size or in a reduced size to fit the screen by calculating the text occupancy amount in the image to be displayed. The image is displayed to the user in a manner of complying with the viewing aim of the user, while avoiding unnecessary load of the computer system.

The area of the image to be displayed may be acquired in advance before applying the method of the invention for displaying the image based on the texts in the image. Similarly, the system of the invention for displaying the image based on the texts in the image may acquire the area of the image in advance before performing the processes. If the area of the image is larger than the display screen's area so that the entire image can not be displayed in its real size on the display screen simultaneously, it is judged whether to display the image in a reduced size to fit the display screen.

The invention may be applicable to search text images from a substantial amount of images and to search text images with relatively more spell and/or grammar errors from a lot of text images, in addition to judging whether to display the image in a reduced size to fit the display screen. The present invention can be implemented in browsers or the plug-ins of the browsers.

The above presentation is provided for explanation and description, but not for enumerating exclusively or limiting the invention to the disclosed specific forms, many modifications and alternations may be made according to the above explanation. It is intended that the scope of the invention is not limited by the detailed description herein, but by the appended claims. The above explanations and the exemplary embodiments provide a complete explanation for constituting and using the invention. Since many embodiments of the invention can be made without departing from the spirit and scope of the invention, the invention is embodied in the appended claims.

What is claimed is:

1. A method for displaying an image based on a text in the image, including:
   a text extracting step, extracting text regions in the image to be displayed;
   a text occupancy amount calculating step, calculating an occupancy amount of the text in the image based on at least one of:
      a number of spelling errors, detected by a spell checker, in the text in the extracted text regions;
      a number of grammar errors, detected by a grammar checker, in the text in the extracted text regions;
      a number of the extracted text regions in the image;
      an average font size of characters in the extracted text regions;
      a percentage of an area of the extracted text regions with respect to an area of the image;
   a comparing step, comparing the calculated occupancy amount with a predetermined threshold;

a display step, determining whether to display the image in a real size or a reduced size based on the comparing step, displaying the image in the real size of the image if the occupancy amount exceeds the predetermined threshold, and displaying the image in the reduced size if the occupancy amount does not exceed the predetermined threshold.

2. The method according to claim 1, wherein in the text extracting step, the text regions in the image are extracted using Optical Character Recognition.

3. The method according to claim 1, wherein the text occupancy amount calculating step includes:
   a checking step, checking at least one of spelling and grammar of the text in the extracted text regions;
   an evaluating step, evaluating the occupancy amount of the text in the image based on the checked condition of the at least one of spelling and grammar.

4. The method according to claim 1, wherein the text occupancy amount calculating step includes:
   a text region counting step, counting the number of the extracted text regions;
   an evaluating step, evaluating the occupancy amount of the text in the image based on the number of the extracted text regions.

5. The method according to claim 1, wherein the text occupancy amount calculating step includes:
   a text region counting step, counting the number of the extracted text regions;
   an average font size calculating step, calculating the average font size of characters in the extracted text regions;
   a text region percentage calculating step, calculating areas of the extracted text regions and percentages of the areas of the text regions with respect to the area of the image;
   an evaluating step, evaluating the occupancy amount of the text in the image based on the number of the text regions, the average font size, and the percentages of the areas of the text regions with respect to the area of the image.

6. The method according to claim 1, wherein the text occupancy amount calculating step includes:
   a checking step, checking at least one of spelling and grammar of the text in the extracted text regions;
   a text region counting step, counting the number of the extracted text regions;
   an evaluating step, evaluating the occupancy amount of the text in the image based on the checked condition of the at least one of spelling and grammar, and the number of the text regions.

7. The method according to claim 1, wherein the text occupancy amount calculating step includes:
   a checking step, checking at least one of spelling and grammar of the text in the extracted text regions;
   a text region counting step, counting the number of the extracted text regions;
   an average font size calculating step, calculating the average font size of the characters in the extracted text regions;
   a text region percentage calculating step, calculating areas of the extracted text regions and the percentage of the areas of the extracted text regions with respect to the area of the image;
   an evaluating step, evaluating the occupancy amount of the text in the image based on the checked condition of the at least one of spelling and grammar, the number of the text regions, the average font size, and the percentage of the areas of the extracted text regions with respect to the area of the image.

8. The method according to claim 1, further including:
   a detecting step, detecting whether a user sends an instruction for displaying the image in a size to fit the display screen;
   a redisplaying step, reducing and displaying the image in the size to fit the display screen if the instruction for displaying the image in the size to fit the display screen is detected.

9. The method according to claim 6, wherein in the checking step, if either a spelling or grammar error is detected in a given extracted text region, the given extracted text region is excluded in the text region counting step.

10. A system for displaying an image based on a text in the image, including:
    a text extractor, extracting text regions in the image to be displayed;
    a text occupancy amount calculator, calculating an occupancy amount of the text in the image based on at least one of:
      a number of spelling errors, detected by a spell checker, in the text in the extracted text regions;
      a number of grammar errors, detected by a grammar checker, in the text in the extracted text regions;
      a number of the extracted text regions in the image;
      an average font size of characters in the extracted text regions;
      a percentage of an area of the extracted text regions with respect to an area of the image;
    a comparator, comparing the calculated occupancy amount with a predetermined threshold;
    a display, determining whether to display the image in a real size or a reduced size based on the comparison, displaying the image in the real size of the image if the occupancy amount exceeds the predetermined threshold, and displaying the image in the reduced size if the occupancy amount does not exceed the predetermined threshold.

11. The system according to claim 10, wherein the text extractor uses Optical Character Recognition to extract the text regions in the image.

12. The system according to claim 10, wherein the text occupancy amount calculator includes:
    a checker, checking at least one of spelling and grammar of the text in the extracted text regions;
    an evaluator, evaluating the occupancy amount of the text in the image based on the checked condition of the at least one of spelling and grammar.

13. The system according to claim 10, wherein the text occupancy amount calculator includes:
    a text region counter, counting the number of the extracted text regions;
    an evaluator, evaluating the occupancy amount of the text in the image based on the number of the extracted text regions.

14. The system according to claim 10, wherein the text occupancy amount calculator includes:
    a text region counter, counting the number of the extracted text regions;
    an average font size calculator, calculating the average font size of characters in the extracted text regions;
    a text region percentage calculator, calculating areas of the extracted text regions and percentages of the areas of the text regions with respect to the area of the image;

an evaluator, evaluating the occupancy amount of the text in the image based on the number of the text regions, the average font size, and the percentages of the areas of the text regions with respect to the area of the image.

15. The system according to claim 10, wherein the text occupancy amount calculator includes:
   a checker, checking at least one of spelling and grammar of the text in the extracted text regions;
   a text region counter, counting the number of the extracted text regions;
   an evaluator, evaluating the occupancy amount of the text in the image based on the checked condition of the at least one of spelling and grammar, and the number of the text regions.

16. The system according to claim 10, wherein the text occupancy amount calculator includes:
   a checker, checking at least one of spelling and grammar of the text in the extracted text regions;
   a text region counter, counting the number of the extracted text regions;
   an average font size calculator, calculating the average font size of the characters in the extracted text regions;
   a text region percentage calculator, calculating areas of the extracted text regions and the percentage of the areas of the extracted text regions with respect to the area of the image;
   an evaluator, evaluating the occupancy amount of the text in the image based on the checked condition of the at least one of spelling and grammar, the number of the text regions, the average font size, and the percentage of the areas of the extracted text regions with respect to the area of the image.

17. The system according to claim 10, further including:
   a detector, detecting whether a user sends an instruction for displaying the image in a size to fit the display screen;
   wherein, the image is reduced and displayed in the size to fit the display screen by the display if the instruction for displaying the image in the size to fit the display screen is detected by the detector.

18. The system according to claim 15, wherein if either a spelling or grammar error is detected in a given extracted text region, the given extracted text region is excluded by the text region counter when counting the number of the extracted text regions.

19. A method for displaying an image based on text in the image, comprising the steps of:
   extracting text regions in the image to be displayed;
   calculating an occupancy amount of the text in the image based on two or more indexes selected from a group of indexes consisting of:
      an index N1 based on a number of spelling errors, detected by a spell checker, in the text in the extracted text regions;
      an index N2 based on a number of grammar errors, detected by a grammar checker, in the text in the extracted text regions;
      an index N3 based on a number of the extracted text regions in the image;
      an index N4 based on an average font size of characters in the extracted text regions;
      an index N5 based on a percentage of an area of the extracted text regions with respect to an area of the image;
   comparing the calculated occupancy amount with a predetermined threshold;
   determining whether to display the image in a real size or a reduced size based on the comparing step;
   displaying the image in the real size of the image if the occupancy amount exceeds the predetermined threshold; and
   displaying the image in the reduced size if the occupancy amount does not exceed the predetermined threshold.

20. The method according to claim 19, wherein the step of calculating the occupancy amount includes the steps of:
   calculating a weighted index for each of the two or more indexes by multiplying the index and a weight for the index;
   calculating a sum of the weighted indexes by summing the weighted index of each of the two or more indexes;
   calculating a weighted normalization factor for each of the two or more indexes by multiplying a full mark for index and the weight for the index;
   calculating a sum of the normalization factors by summing the weighted normalization factor for each of the two or more indexes;
   calculating a normalized occupancy amount by dividing the sum of the weighted indexes by the sum of the normalization factors.

* * * * *